W. S. BRISTOL.
BRAKE LOCK.
APPLICATION FILED DEC. 2, 1910.
1,004,357.
Patented Sept. 26, 1911.
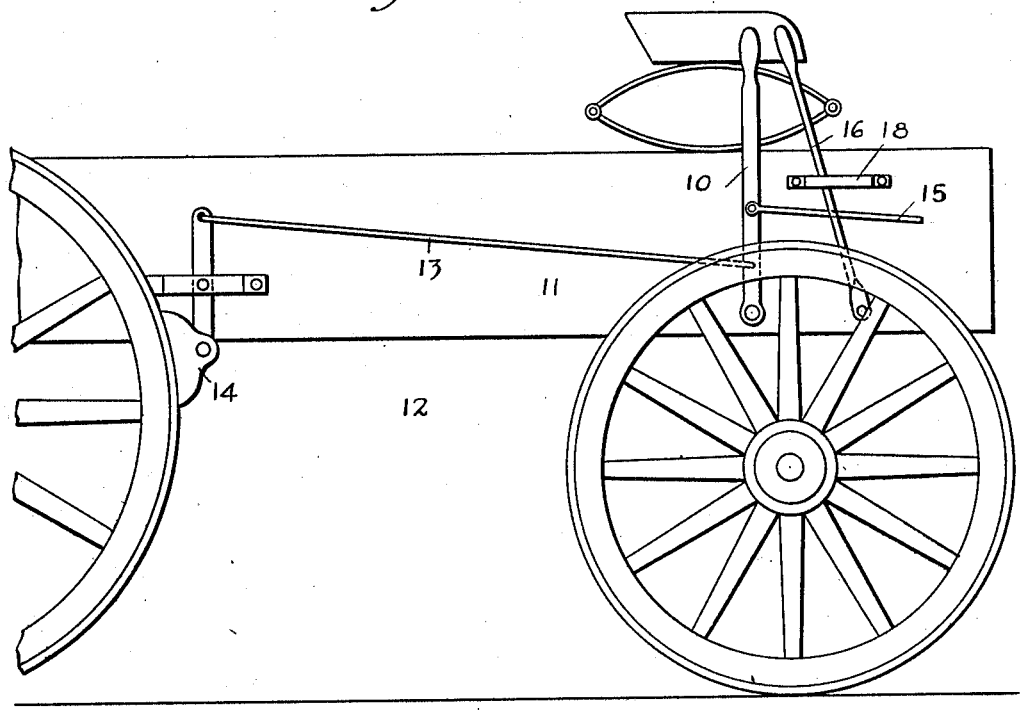
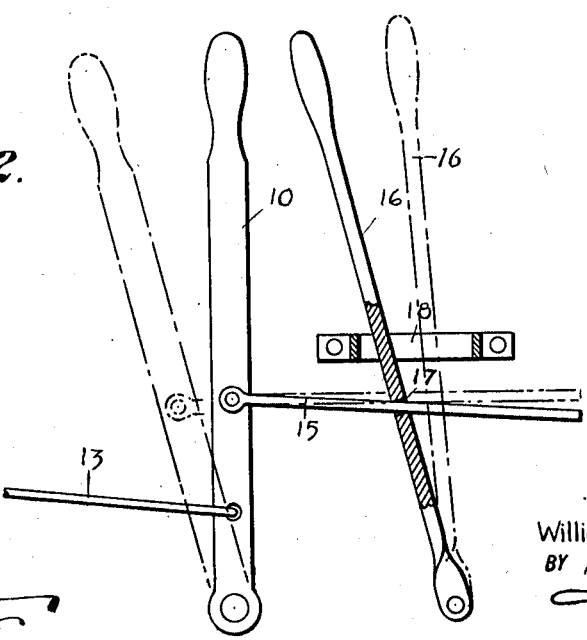
WITNESSES
Edw. Thorpe
P. A. Hoster
INVENTOR
William S. Bristol
BY
ATTORNEYS

UNITED STATES PATENT OFFICE.

WILLIAM SEWARD BRISTOL, OF ANTHONY, KANSAS.

BRAKE-LOCK.

1,004,357. Specification of Letters Patent. Patented Sept. 26, 1911.

Application filed December 2, 1910. Serial No. 595,248.

*To all whom it may concern:*

Be it known that I, WILLIAM S. BRISTOL, a citizen of the United States, and a resident of Anthony, in the county of Harper and State of Kansas, have invented a new and Improved Brake-Lock, of which the following is a full, clear, and exact description.

The invention relates to brakes and has for an object to provide a brake lock for releasably locking the brakes on vehicles and the like.

To accomplish the desired result use is made of a brake lever for connection with a brake shoe, a locking rod mounted on the brake lever, a locking lever adapted to be engaged by the locking rod to lock the brake lever relatively to the locking lever and means for limiting the movement of the locking lever.

Reference is to be had to the accompanying drawings, constituting a part of this specification, in which similar characters of reference denote corresponding parts in all the views, and in which—

Figure 1 is a partial side elevation of a wagon equipped with my brake lock; and Fig. 2 is a fragmentary sectional view showing the locking lever and brake lever relatively locked with the normal or unlocked position of the said levers indicated by dotted lines.

Referring more particularly to the views, I employ a brake lever 10 pivotally mounted on a wagon box 11 of a wagon 12 and attached to a brake rod 13 connected with a brake shoe 14. Pivotally mounted on the brake lever 10 is a locking rod 15 and a locking lever 16 is pivotally mounted on the wagon box 11 and provided with a transversely extending hole 17 adapted to slidably receive the locking rod 15. A guide 18 is secured to the wagon box 11 with the locking lever 16 disposed therebetween to limit the movement of the said locking lever as is conveniently shown in Fig. 2.

When the brake lever 10 and the locking lever 16 are substantially parallel, the locking rod 15 will lie loosely in the hole 17 of the locking lever 16. To apply the brake shoe 14 to the wheel of the wagon 12, the brake lever 10 is moved forwardly to engage the brake shoe with the vehicle wheel. The locking lever 16 then moves toward the brake lever thus clamping the locking rod 15 to the locking lever 16 and holding the said lever and brake lever relatively rigid to hold the brake shoe 14 against the wheel of the wagon.

To release the brake shoe from the wagon wheel the locking lever 16 is moved to its initial position, thus unclamping the locking rod 15 from the locking lever 16 and releasing the brake lever 10, thus also releasing the brake shoe from the wheel of the wagon.

Although I have shown a particular construction for the purpose of describing my device it will be understood that the same may be slightly varied and that the scope of the invention is defined in the appended claims.

Having thus described my invention, I claim as new and desire to secure by Letters Patent:

1. In a device of the class described, the combination of a brake rod adapted to coöperate with the brake shoe, of a pivoted brake lever having a locking rod thereon, a locking lever having an opening therein, the said locking rod entering the said opening whereby as the brake lever is moved in one direction, the said rod will engage the edged portions of the said opening in the said locking lever, whereby the brake lever will be held in position.

2. In a device of the class described, the combination of a brake lever having a brake rod extending therefrom for engagement with the brake shoe, a locking rod pivotally carried by the brake lever, a pivoted locking lever having an opening therein, the said locking rod lying within the said opening whereby as the brake lever is moved in one direction, the said locking rod will engage with the edged portions of the said opening, thereby holding the brake lever locked in position.

3. In a device of the class described, a pivoted brake lever, a locking rod extending substantially normal to the said brake lever and pivotally supported thereon, a locking lever adapted to be pivotally supported on the wagon body adjacent the said brake lever, the said locking lever having an opening therein of slightly greater diameter than the said locking rod, the said locking rod engaging in the said opening, whereby as the brake lever is moved in one direction the locking rod thereon will engage opposite
5 edged portions of the said opening in the locking rod, thereby locking the said brake lever in position.

In testimony whereof I have signed my name to this specification in the presence of two subscribing witnesses.

WILLIAM SEWARD BRISTOL.

Witnesses:
P. O. HEROLD,
V. O. JOHNSON.

Copies of this patent may be obtained for five cents each, by addressing the "Commissioner of Patents, Washington, D. C."